United States Patent
Middlecamp et al.

(10) Patent No.: US 8,260,830 B2
(45) Date of Patent: Sep. 4, 2012

(54) ADAPTING A TIMER BOUNDED ARBITRATION PROTOCOL

(76) Inventors: William J. Middlecamp, Apple Valley, MN (US); Tim LaBerge, St. Paul, MN (US); John Reinart, Roseville, MN (US)

( * ) Notice: Subject to any disclaimer, the term of this patent is extended or adjusted under 35 U.S.C. 154(b) by 177 days.

(21) Appl. No.: 12/821,350

(22) Filed: Jun. 23, 2010

(65) Prior Publication Data
US 2011/0113066 A1 May 12, 2011

Related U.S. Application Data

(60) Provisional application No. 61/259,271, filed on Nov. 9, 2009.

(51) Int. Cl.
*G06F 12/00* (2006.01)
(52) U.S. Cl. ........................................ 707/822
(58) Field of Classification Search .................. 707/761, 707/822
See application file for complete search history.

(56) References Cited

U.S. PATENT DOCUMENTS

2006/0168192 A1* 7/2006 Sharma et al. ............... 709/224
* cited by examiner

*Primary Examiner* — Truong Vo

(57) ABSTRACT

Example apparatus, methods, and computers prevent a split brain scenario in a pair of high availability servers by maintaining single writer access to a resource. One example method includes monitoring control of an arbitration (ARB) block by an active file system manager (FSM). An active file system portmapper (FSMPM) simultaneously requests permission from a standby FSM to restart a dead-man timer. The active FSM attempts to maintain control of the ARB block before expiration of the dead-man timer. If the active FSM is unable to maintain control of the ARB block before expiration of the dead-man timer, a hardware reset of an apparatus running the active FSM is forced. Therefore, the active FSMPM and standby FSM negotiate for additional time to maintain control of the ARB block to maintain single writer access and avoid unnecessary hardware resets.

17 Claims, 6 Drawing Sheets

ADAPTING A TIMER BOUNDED ARBITRATION PROTOCOL

CROSS REFERENCE TO RELATED APPLICATIONS

This application claims the benefit of U.S. Provisional Patent Application 61/259,271 filed Nov. 9, 2009.

BACKGROUND

Networked systems of computers allow parallel and distributed computing. Networked systems of computers may act as clusters, where the computers are nodes in the clusters. Clusters may function collectively as operational groups of servers. The nodes of a cluster or other multi-node computer system may function together to achieve high server system performance, availability, and reliability. High availability (HA) systems facilitate a standby server taking over in the event of undesired failures on a primary server. Goals for a HA system include providing safety and uninterrupted operation. If a primary server fails, failover should occur automatically and operations should resume on a secondary server. However, at any point in time, only one of the primary server or the secondary server should have write access to certain items. For example, at any point in time there should only be one server with write access to file system metadata to prevent corruption of the metadata. When two servers both have write access, this may be referred to as a split brain scenario (SBS).

Conventional systems may have employed protocols and techniques for preventing multiple writer access leading to a SBS. However, these conventional systems may have had no bounds on the timing for a protocol. Additionally, these systems may have been "trigger happy," which led to unnecessary hardware resets when an ambiguous or non-deterministic state was encountered. One unintentional occurrence that could lead to an undesired hardware reset involves a communications network breakdown or slowdown. Additionally, disk operations becoming congested can lead to a slowdown, even when a communications network (e.g., local area network (LAN)) is working. When synchronizing communications are lost, a hardware reset may be forced, even though all parts of the system except the communications network are healthy and single writer access is still in place.

BRIEF DESCRIPTON OF THE DRAWINGS

The accompanying drawings, which are incorporated in and constitute a part of the specification, illustrate various example methods, apparatus, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
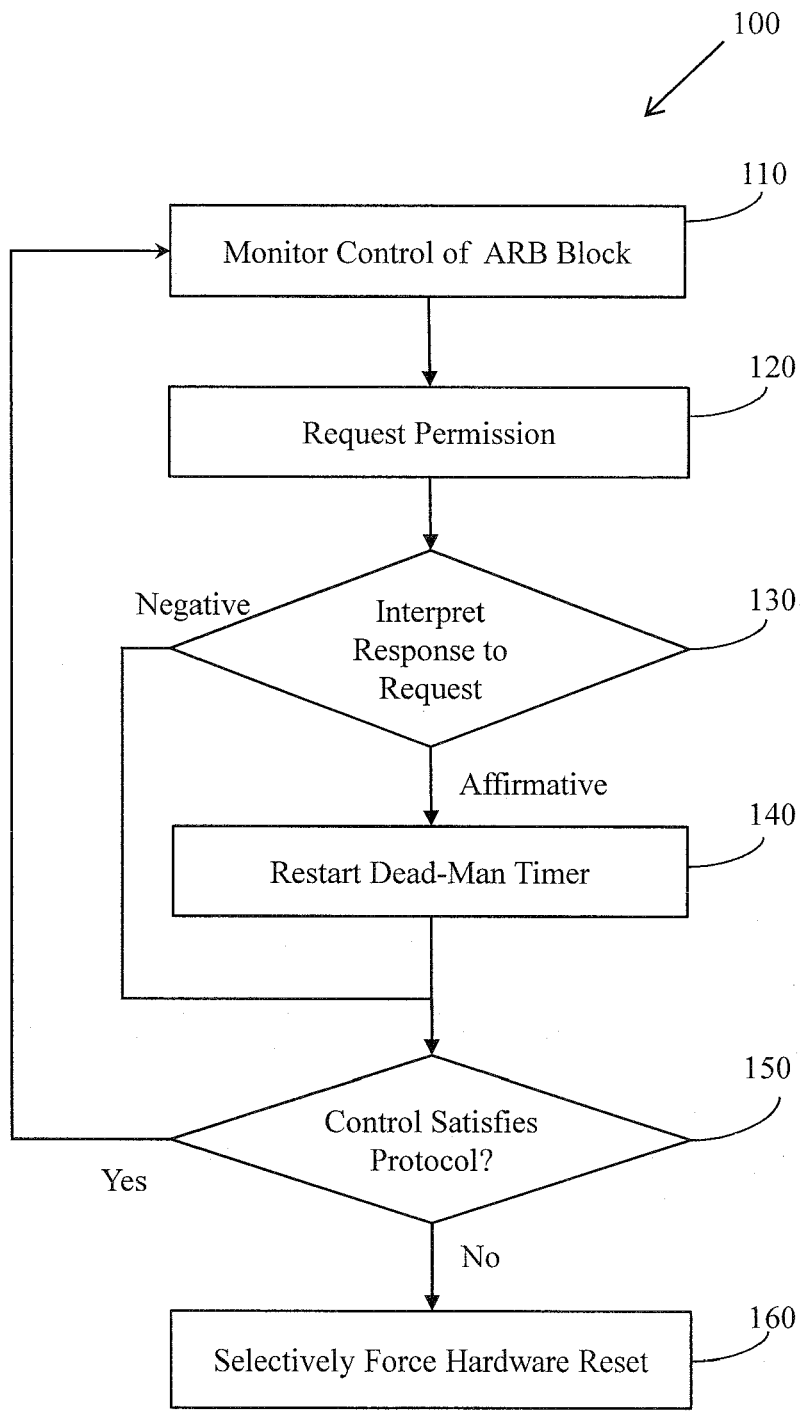
FIG. 1 illustrates a method for maintaining single writer access between a pair of high availability servers.

Example apparatuses and methods prevent a split brain scenario (SBS) where both servers in a high availability (HA) pair could have write access to resources (e.g., file system metadata, databases) for which there should only be single writer access. In one example, a failing server requests that a standby server not attempt to gain write access for a predetermined amount of time to allow the failing server an opportunity to avoid an unnecessary reset by restarting a dead-man timer. If impending failure for the failing server is not cured before the dead-man timer expires, the failing server is reset, and the standby server can acquire write access without risking SBS. If an attempt to gain write access for the standby server is imminent, permission to restart the dead-man timer is denied.

Example apparatuses and methods rely on a timer bounded arbitration (ARB) protocol that uses an ARB block for coordination. The ARB block is updated by a controlling (e.g., active, primary) server for a file system. On a periodic basis, the controlling server will send a request to a standby server to ask permission to restart a dead-man timer on the controlling server to allow the controlling server additional time to update the ARB block. The standby server responds affirmatively if it is not attempting to acquire or begin writing the ARB block, and then the standby server will not attempt to acquire or begin updating the ARB block until a predetermined amount of time expires. The controlling server measures the response time of a granted request, and when it is received within the predetermined amount of time (e.g., less than one second), the controlling server restarts the dead-man timer.

In one example, control of and access to file system metadata is regulated through an ARB dedicated disk block. The timer bounded ARB protocol for resource control regulates acquiring control of the ARB block, maintaining control of the ARB block, and usurping control of the ARB block. An active file system manager (FSM) that has control of the ARB block will periodically write to the ARB block to "brand" the ARB block and thereby signal ownership and active control. When the active FSM that has control of the ARB block successfully brands the ARB block, the process restarts a "dead-man" timer. If the ARB block is not written before the dead-man timer expires, a hardware reset is done because the timer bounded ARB protocol for resource control has been violated. However, inability to brand the ARB block may merely be due to a temporary condition that can be resolved with additional time.

To avoid unnecessary hardware resets during periods when the ARB block cannot be updated but the FSM is otherwise operating correctly, the file system portmapper (FSMPM) for the active FSM periodically sends a request to a standby FSMPM for permission to restart the active FSM's dead-man timer. This timer restart makes the active FSM less trigger happy, which facilitates reducing the number of unnecessary hardware resets. Implicit in the request is a further request that a standby FSM, associated with the standby FSMPM, not attempt to usurp control of the ARB block for a short period of time. If the standby FSMPM responds affirmatively, and the response is received within a fixed time limit, the active FSM's dead-man timer is restarted by its FSMPM. The time periods mentioned here are scaled to the dead-man timer value in such a way that the timer bounded ARB protocol prevents SBS.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

FIG. 1 illustrates a method 100. Method 100 facilitates maintaining single writer access between a pair of high availability servers. Method 100 includes, at 110, monitoring control of an ARB block. An active FSM may be configured to monitor control of the ARB block. The active FSM maintains control of the ARB block by periodically writing to the ARB block according to a timer bounded ARB protocol.

The monitoring at 110 may include monitoring whether the active FSM is reading the ARB block. The monitoring may additionally or alternatively include determining whether the active FSM has written the ARB block within a predetermined time period associated with the timer bounded ARB protocol. The predetermined time period may be regulated by a bounding timer. The monitoring at 110 may also include monitoring whether the active FSM has reset the bounding timer upon successfully writing the ARB block. The monitoring at 110 may also include resetting the hardware if the dead-man timer expires.

Method 100 includes, at 120, requesting permission from the standby file system portmapper (FSMPM) associated with the standby FSM. The FSMPM for the active FSM requests permission to avoid a SBS scenario. Recall that a SBS can occur if both the active FSM and the standby FSM have write access to a protected resource (e.g., file system metadata, database). Therefore, the standby FSM may be activated and a hardware reset may be forced to prevent the active FSM from violating the timer bounded ARB protocol. However, to avoid unnecessary hardware resets the FSMPM for the active FSM may send a request to the standby FSMPM asking for permission to reset a dead-man timer on the active FSM.

At 130, the active FSMPM may receive a response within a fixed time period concerning the requested permission. If the response is Negative or not received within the period, then processing jumps to 150. If the determination is Affirmative, then processing continues at 140. An Affirmative determination indicates permission being granted by the standby FSMPM. An Affirmative response indicates that the standby FSMPM will not issue an activation command for a fixed time period. Accordingly, the standby FSM will not attempt to establish control of the ARB block. Thus, single writer access is maintained by the active FSM.

Method 100 includes, at 140, restarting the dead-man timer. Therefore, if the active FSM's inability to brand the ARB block was caused by a temporary condition, the active FSM is given more time to brand the ARB block.

At 150, a determination is made concerning whether the control satisfies the timer bounded ARB protocol. If the determination is Yes, then processing returns to monitoring at 110. If the determination is No, then processing continues at 160. At 160, method 100 includes selectively forcing a hardware reset of an apparatus running the active FSM because the active FSM's dead-man timer expires. In one example, forcing the hardware reset at 160 is performed without a communication with the standby FSM and without an action by the active FSM. When the active FSM is subject to a hardware reset at 160, the standby FSM may establish control of the ARB block.

Therefore, the ability of the active FSM's FSMPM to request permission to restart the dead-man timer allows the active FSM to negotiate with the standby FSM. The negotiation protects against a SBS by ensuring only one FSM attempts to establish control of the ARB block, thereby maintaining single writer access. The negotiation between the active FSM and the standby FSM also prevents unnecessary hardware resets by giving the active FSM an opportunity to maintain control when the system may be slow but is otherwise healthy.

Figure 2:
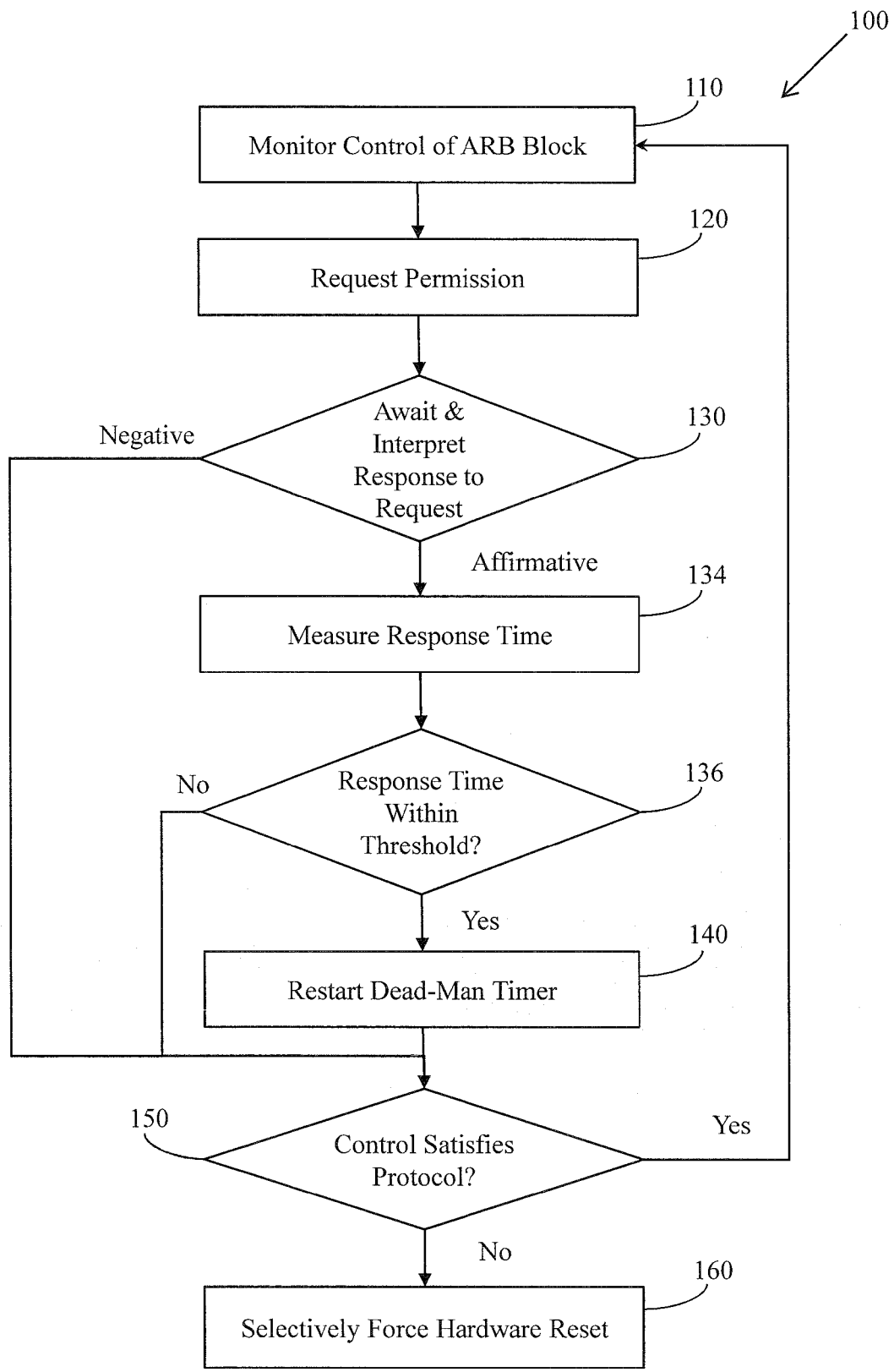
FIG. 2 illustrates a method for maintaining single writer access between a pair of high availability servers.

FIG. 2 illustrates another embodiment of method 100. The method 100 of FIG. 2 illustrates an alternative or additional manner to maintain single writer access between a pair of high availability servers.

The dead-man timer may be utilized to monitor control of the ARB block. The dead-man timer may be used to define the periodicity of the periodic writing of the ARB block. The timer bounded ARB protocol may define a violation as the active FSM failing to brand the ARB block before the expiration of the dead-man timer. The forcing of a hardware reset upon expiration of the dead-man timer avoids a violation. Alternatively, if the active FSM is able to brand the ARB block, the dead-man timer is restarted to begin a new period.

In this embodiment of method 100, at 120, the FSMPM for the active FSM requests permission from the standby FSMPM. At 130, the active FSMPM may receive a response concerning the requested permission. If the response is not received or Negative, then the standby FSM may have or may be ready to attempt to take control of the ARB block. Therefore, to maintain single writer access, the dead-man timer is not restarted. The standby FSM may establish control of the ARB block while the active FSM undergoes a hardware reset. If the determination is Affirmative, then processing continues at 134.

At 134, a response time between the active FSMPM requesting permission from the standby FSMPM and the active FSMPM receiving an affirmative response from the standby FSMPM is measured. At 136, it is determined whether the response time is within a predetermined threshold. The predetermined threshold defines a length of time between the request for permission being sent to the standby FSMPM and an affirmative response being received by the active FSMPM. If the affirmative response is received within the predetermined threshold, the method 100 may proceed to 140. Conversely, if the time to receive the affirmative response is not within the predetermined threshold, the method 100 proceeds to 150. At 150, a determination is made concerning whether the control satisfies the timer bounded ARB protocol. If the determination is Yes, then processing returns to monitoring at 110. If the determination is No, then processing continues at 160. At 160, the method may include selectively forcing a hardware reset at 160. At 160, the method may include activating a standby FSM.

Exceeding the predetermined threshold may indicate a system failure or system slowdown severe enough to merit a hardware reset. However, not all slowdowns merit a hardware reset. Therefore, the active FSM is able to negotiate for additional time to avoid unnecessary hardware resets. Recall that conventional systems have been "trigger happy," which led to unnecessary hardware resets when an ambiguous or non-deterministic state was encountered. Method 100 facilitates necessary hardware resets while preventing unnecessary hardware resets by monitoring communications, for example, in the manner described at 134 and 136. Accordingly, efficient single writer access is maintained.

In one example, a method may be implemented as computer executable instructions. Thus, in one example, a computer readable medium may store computer executable instructions that if executed by a computer (e.g., high availability server) cause the computer to perform the method described above. While executable instructions associated with the above method are described as being stored on a computer readable medium, it is to be appreciated that executable instructions associated with other example methods described herein may also be stored on a computer readable medium.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

Figure 3:
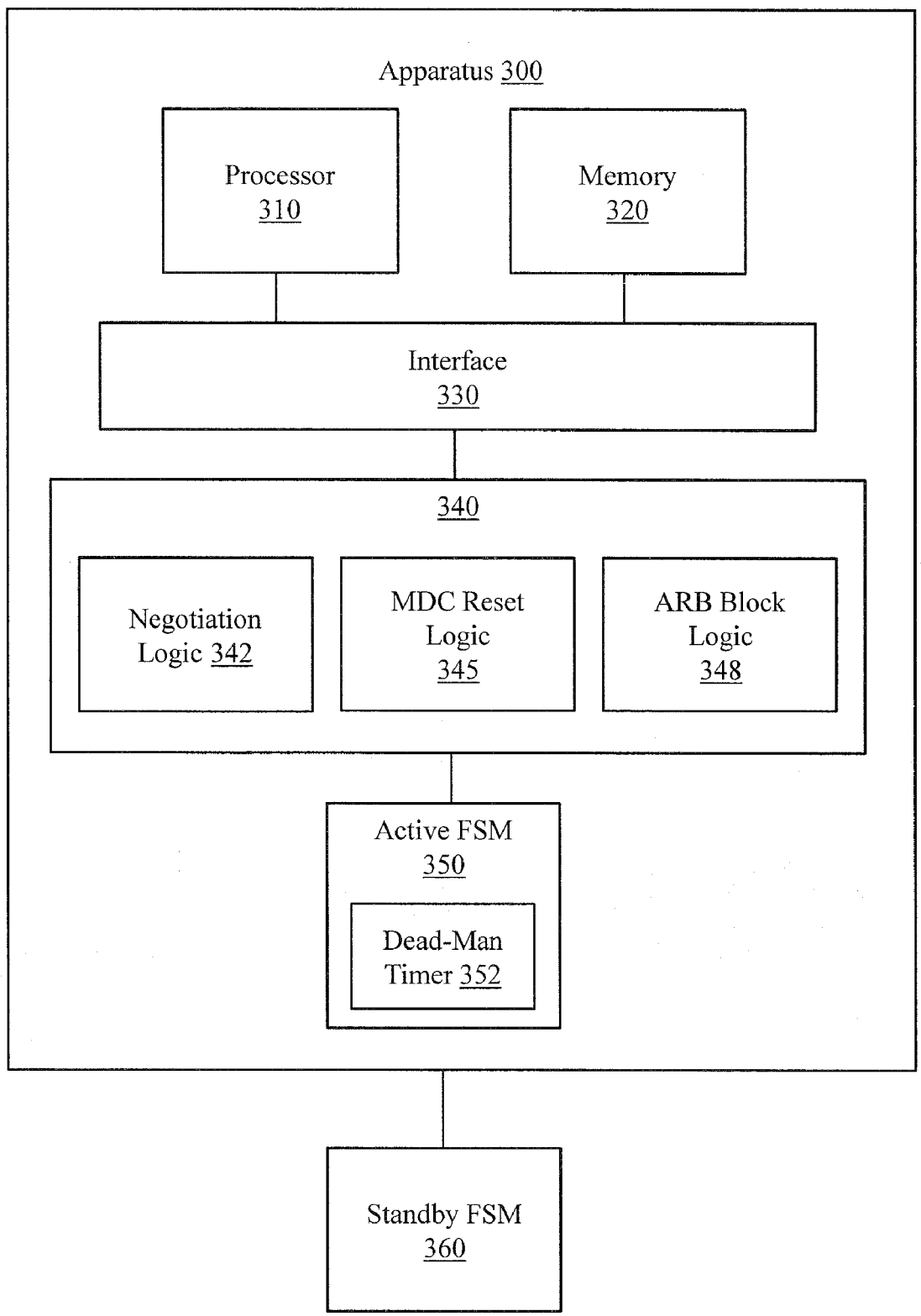
FIG. 3 illustrates an apparatus that facilitates maintaining single writer access between a pair of high availability servers.

FIG. 3 illustrates an apparatus 300. Apparatus 300 facilitates maintaining single writer access between a pair of high availability servers. Apparatus 300 includes a processor 310, a memory 320, and an interface 330. Interface 330 connects the processor 310, the memory 320, and a set of logics 340. The set of logics 340 may include a negotiation logic 342, a metadata controller reset logic 345, and an arbitration logic 348. The set of logics 340 is connected to an active FSM 350. The active FSM 350 may be, for example, a process running on apparatus 300.

The active FSM 350 may also be implemented, for example, in an ASIC in apparatus 300. A standby FSM 360 is communicatively coupled to the apparatus 300.

Apparatus 300 is configured to prevent an SBS by controlling the active FSM 350 and the standby FSM 360 so that only one of them will have write access to a protected resource (e.g., file system metadata, database) at any given point in time. Therefore, in one example, the negotiation logic 342 is configured to negotiate between the active FSM 350 and standby FSM 360.

The negotiation logic 342 controls the active FSM 350 to selectively request permission to relax the timer bounded ARB protocol from a standby FSM 360 to avoid the active MDC 350 violating the timer bounded ARB protocol. The timer bounded ARB protocol relies on an ARB block acting as a resource shared between the active FSM 350 and the standby FSM 360. If permission is granted, a dead-man timer 352, associated with the active FSM 350, is restarted to allow additional time given to the active FSM to maintain the timer bounded ARB protocol. Also, if permission is granted, the standby FSM 360 will not be activated for a limited time in order to give the active FSM additional time for maintaining the timer bounded ARB protocol. If permission is not granted, a hardware reset of the apparatus 300, on which active FSM 350 is running, may be forced to avoid violating the timer bounded ARB protocol and to maintain single writer access.

The negotiation logic 342 may be configured to repeatedly request permission from a standby FSM 360. For example, the negotiation logic 342 initially controls the active FSM 350 to request permission from the standby FSM 360. If permission is granted, the dead-man timer 352 is restarted. The active FSM 350 maintains control of the ARB block by writing a brand in the ARB block. In the event that the active FSM 350 is unable to write its brand in the ARB block, the FSM 350 may also request permission from the standby FSM 360 to restart the dead-man timer 352.

Additionally, the negotiation logic 342 may be configured to measure a response time between requesting permission from the standby FSM 360 and receiving the requested permission at the active FSM 350. If the response time is within a predetermined limit, the active FSM 350 may restart a dead-man timer 352.

The metadata controller reset logic 345 is configured to selectively force a hardware reset of the active FSM 350 associated with the apparatus 300.

In one example, the metadata controller reset logic 345 is configured to control a kernel thread to terminate the active FSM 350. One skilled in the art appreciates that the term "kernel" is used in its computer science and operating system term of art form. Similarly, one skilled in the art appreciates that the term "thread" is used in its computer science and operating system term of art form. In one example, portions of the processing performed by the metadata controller reset logic 345 may be performed by a kernel thread.

The ARB block logic 348 may be configured to synchronize control of the ARB block by using the ARB block. Therefore, the ARB block can be used by the timer bounded ARB protocol and also can control the timer bounded ARB protocol. Thus, to prevent SBS, in one example, the metadata controller reset logic 345 is configured to terminate the active FSM 350 before the standby FSM 360 takes control of the ARB block.

Figure 4:
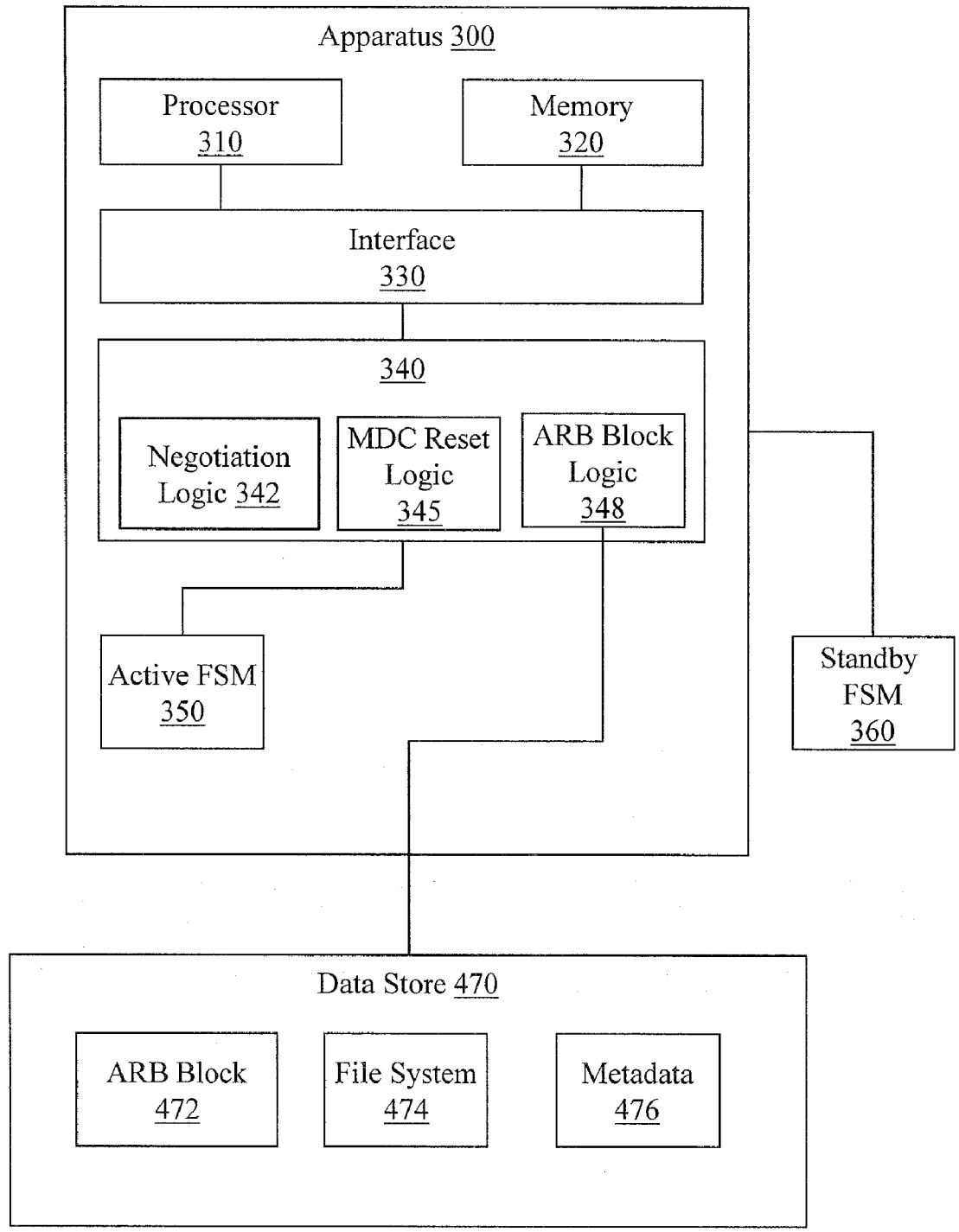
FIG. 4 illustrates an apparatus that facilitates maintaining single writer access between a pair of high availability servers.

FIG. 4 illustrates another embodiment of apparatus 300. Apparatus 300 facilitates maintaining single writer access between a pair of high availability servers participating in a timer bounded arbitration protocol for resource control. In this embodiment of apparatus 300, the ARB block logic 348 is configured to communicate with a data store 470. The data store 470 stores an ARB block 472, at least a portion of a file system 474 associated with the file system metadata 476, and the file system metadata 476. In this embodiment, the timer bounded arbitration protocol protects the metadata 476 using the ARB block 472 that actually resides on the same data storage device as the metadata 476 that is being protected.

Figure 5:
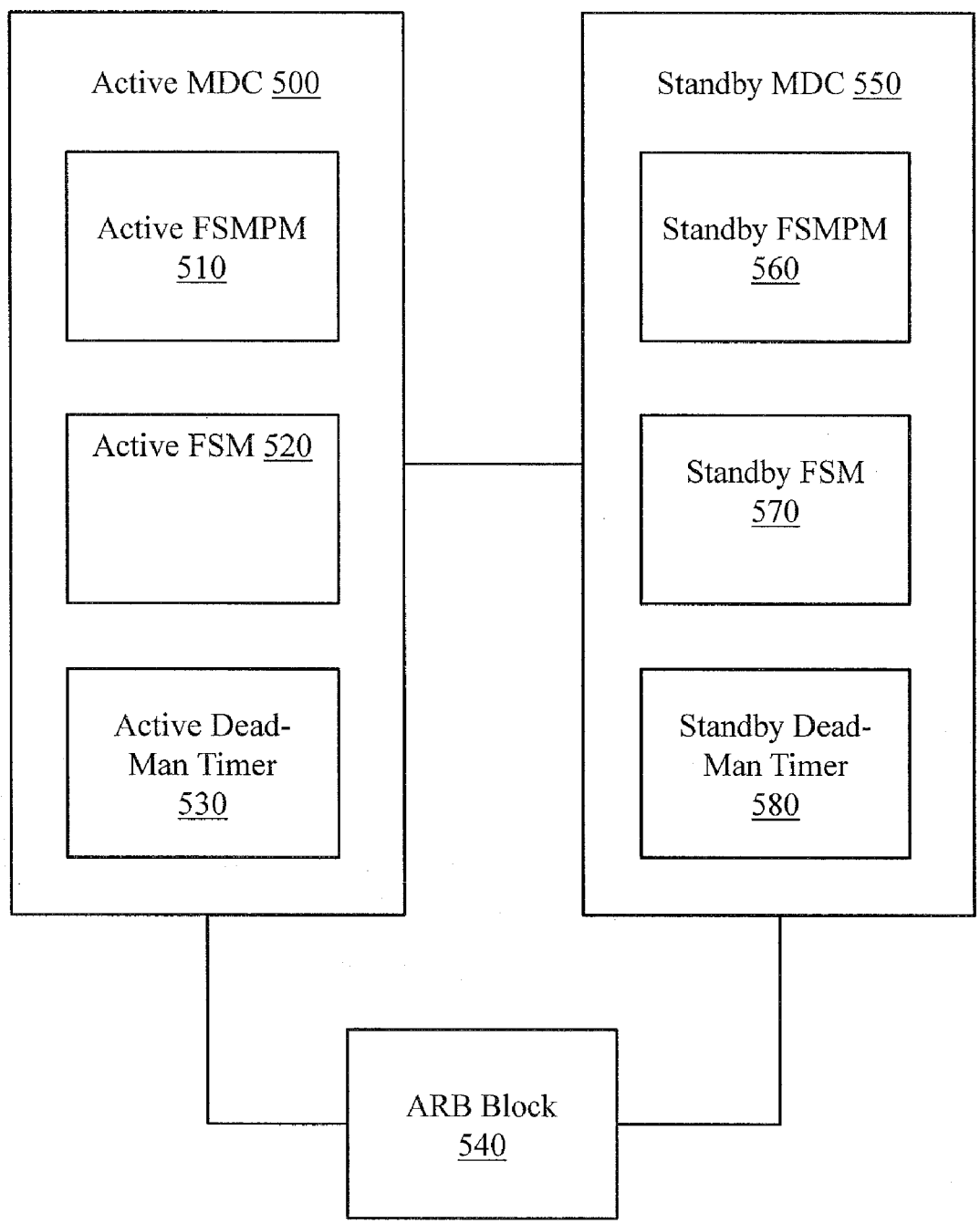
FIG. 5 illustrates a pair of metadata controllers that maintain single writer access between a pair of high availability servers.

FIG. 5 illustrates a pair of MDCs used in a system for maintaining single writer access between a pair of high availability servers. The pair of MDCs includes active MDC 500 and standby MDC 550. The active FSM 520 may correspond to active FSM 350 of FIG. 3. The standby FSM 570 may correspond to standby FSM 360 of FIG. 3.

Active MDC 500 includes an active file system portmapper (FSMPM) 510, an active file system manager (FSM) 520, and an active dead-man timer 530. The standby MDC 550 includes a standby FSMPM 560, a standby FSM 570, and a standby dead-man timer 580. The active FSMPM 510 is connected to the active FSM 520 by a socket. Likewise, the standby FSMPM 560 is connected to the standby FSM 570 by a socket.

The active FSMPM 510 is configured to provide a heartbeat signal to the coordinator (not shown). Where the active FSMPM is configured to provide a heartbeat signal, the timer bounded ARB protocol may define an amount of elapsed time between heartbeats. Therefore, one way that standby FSMPM 560 can determine that active FSM 520 is not operating properly is by monitoring the heartbeat signal.

The active FSM 520 is configured to maintain ownership of an ARB block 540 by periodically writing the ARB block 540 according to the timer bounded ARB protocol. The active dead-man timer 530 is reset upon successfully writing the ARB block 540. Before the expiration of the active dead-man timer 530, the active FSMPM 510 may request permission to reset the active dead-man timer 530. If permission is granted, the active FSM 520 may attempt to maintain control by updating the ARB block 540 before the active dead-man timer 530 expires.

In this manner the active FSM 520 can negotiate for additional time to retain control of the ARB block 540. Also if permission is granted, the standby FSM 570 will not attempt to establish control of the ARB block 540 for a predetermined amount of time. Therefore, the negotiation affords the active FSM 520 the opportunity to maintain control of the ARB block 540 in situations where a hardware reset is unnecessary (e.g., minor system delay or slowdown). Furthermore, single writer access is maintained via the negotiation.

The active FSMPM 510 can also be configured to selectively force an election of an FSM to replace the active FSM 500 as the single writer upon a determination that the active FSM 500 has exited. Therefore, the active FSMPM 510 may establish the standby FSM 570 as the replacement of the active FSM 520. Accordingly, an activation command is sent to the standby FSM 570.

The standby FSM 570 monitors the ARB block 540 for a safety period of time before writing to the ARB block 540. During the safety period of time the standby FSM 570 monitors the ARB block 540 to ensure that the active FSM 520 is not writing to the ARB block 540. Once the safety period expires and it is determined the active FSM 520 has not written to the ARB block 540, the standby FSM 570 may write to the ARB block. This way single writer status is maintained during the transition of control from the active FSM 520 to the standby FSM 570.

The active MDC 500 violates the timer bounded ARB protocol when the active FSM 520 has not exited before the active dead-man timer 530 expires. If the timer bounded ARB protocol is violated, a hardware reset will be forced, and an election is held to select a standby MDC 550 to replace the active MDC 500.

The standby FSMPM 560 is configured to selectively activate the standby FSM 570 to take control of the ARB block 540 after being elected to replace the active MDC 500. The standby FSM 570 is configured to acquire ownership of the ARB block 540, to maintain ownership of the ARB block 540 by periodically writing the ARB block 540 according to the timer bounded ARB protocol, and to reset the standby dead-man timer 580 upon successfully writing the ARB block 540. In one embodiment, the active MDC 500 and the standby MDC 550 reside on separate pieces of computer hardware and communicate over a computer network.

By way of illustration, the negotiation for more time to maintain an ARB block brand may proceed as follows. When an active FSM is operating optimally, it maintains its ownership of the ARB block by re-branding the ARB block every 0.5 seconds. After each branding write, the active FSM restarts its dead-man timer. If the standby FSM is activated and attempts to usurp control; it must monitor the ARB block for a period of two seconds to observe the control by the active FSM, and then it may overwrite an active brand only if it has better connectivity to clients. When the active FSM observes a brand from another FSM, it must exit. If the active FSM writes its brand over the activating standby FSMs brand without observing the standby FSM's brand because of timing, the standby FSM will restart the usurpation. If an active or activating FSM does not update its brand for a period longer than the dead-man timer, which is typically five seconds, a hardware reset is forced. Simultaneously, a request to reset the timer is sent from the active FSMPM for its active FSMs to the standby FSMPM at the rate of once per two seconds. The standby FSMPM processes the request per FSM as follows: it denies the request if it has activated the FSM or has a pending activation, otherwise it grants the request. The FSMPM starts a two-second timer for the granted requests, during which it will delay an activation of the corresponding standby FSM. If the FSMPM for the active FSMs does not receive the response from the standby FSMPM within one second, it sends another request. If the FSMPM for the active FSMs receives the response within one second, it restarts the timer for each corresponding FSM for which the request has been granted. In this way, an FSM that is unable to rebrand its ARB block is allowed more time to complete the rebranding while avoidance of SBS is maintained. However, when the active FSM is not operating correctly in addition to not maintaining its brand of the ARB block: an election may occur that leads to activation of the standby FSM; the two-second negotiated delay of activation will expire and the standby FSM will be activated; the dead-man timer of the active FSM will expire and force a hardware reset; and the standby FSM will complete its activation. In this way, unnecessary hardware resets are avoided while the high-availability performance is available when necessary.

FIG. 5 illustrates the active dead-man timer 530 and the standby dead-man timer 580 as being internal to the active MDC 500 and the standby MDC 550 respectively. One skilled in the art will appreciate that the dead-man timers 530 and 580 may be part of an MDC or may be external to but used by an MDC. For example, a dead-man timer may be external to a process and/or hardware implementing an active MDC 500 or a standby MDC 550. Therefore, in different examples, the active dead-man timer 530 can be, but is not limited to being, a kernel timer, an operating system timer, and a timer associated with computer hardware (e.g., peripheral component interconnect express (PCIE) card) operatively connected to an interface visible to active MDC 500. In one embodiment, there is one dead-man timer per active FSM 520. Similarly, the standby dead-man timer 580 can be, but is not limited to being, a kernel timer, an operating system timer, and a timer associated with computer hardware (e.g., PCIE card) operatively connected to an interface visible to the standby MDC 550. There is one dead-man timer per standby FSM 570.

The active MDC 500 and the standby MDC 550 participate in the timer bounded ARB protocol. In one example, the timer bounded ARB protocol includes controlling the active FSM 520 to write the ARB block 540 once per FSM write period. The periodic writing indicates continued ownership of the ARB block 540. When a write to the ARB block 540 is successful, the active FSM 520 will reset the active dead-man timer 530 to a reset threshold period. Recall that it is the expiration of the active timer 530 that forces a hardware reset of the active MDC 500.

One skilled in the art will appreciate that a failover system for a pair of high availability servers can be arranged in different environments and may experience different operating conditions, different communication conditions, and other different factors. Therefore the timer bounded ARB protocol may have different time delays. In one embodiment, the FSM write period employed by the active dead-man timer 530 is 5 seconds. The active FSMPM 510 associated with the active FSM 520 sends a request to the standby FSMPM 560 to ask permission to restart the active dead-man timer 530. The active FSMPM 510 may measure the round trip time of the request and reset the active dead-man timer 530 if permission was granted in less than a second.

Figure 6:
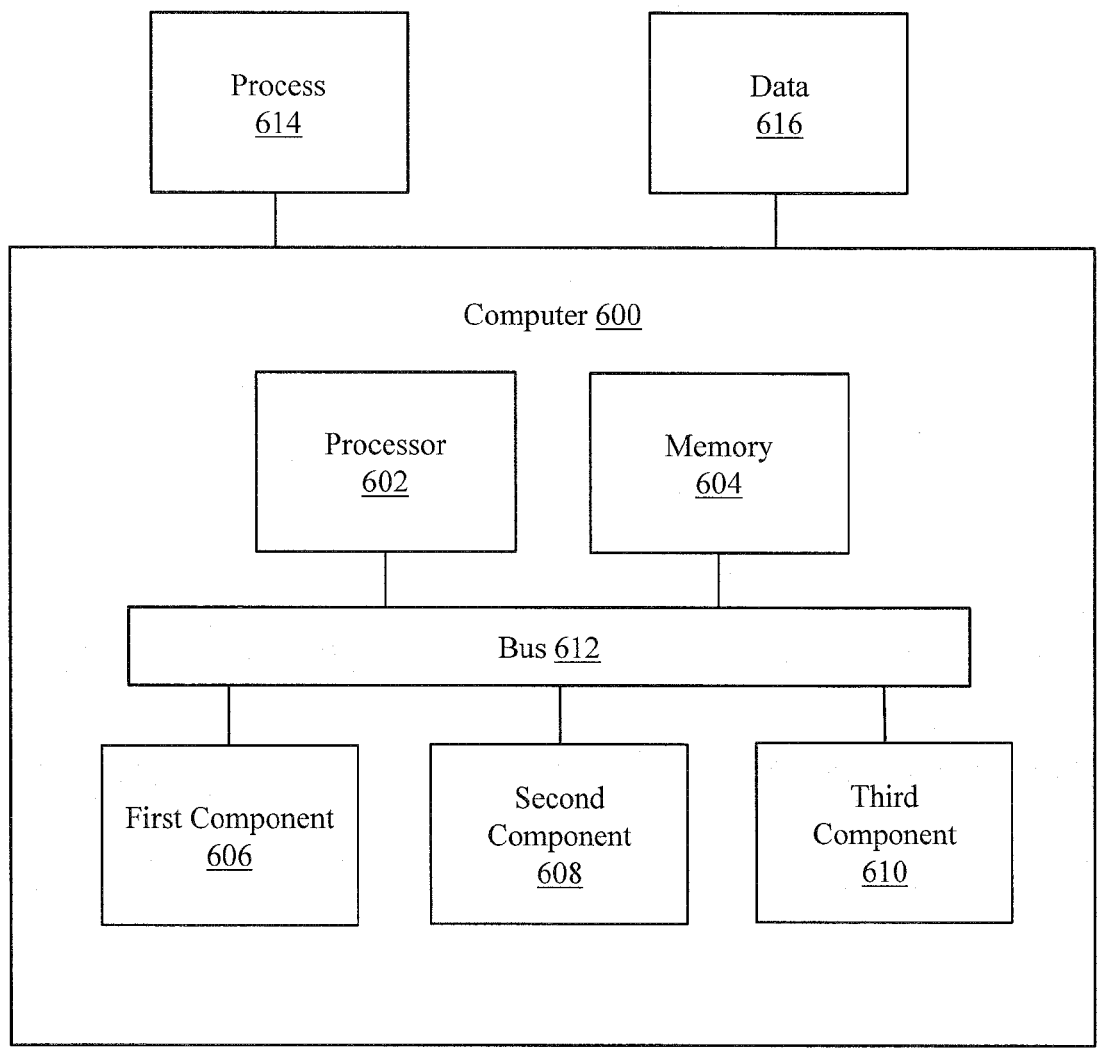
FIG. 6 illustrates a computer that facilitates maintaining single writer access between a pair of high availability servers.

FIG. 6 illustrates a computer 600 that facilitates maintaining single writer access between a pair of high availability servers by participating in a timer bounded ARB protocol for resource control. Computer 600 includes a processor 602 and a memory 604 that are operably connected by a bus 612. In one example, the computer 600 may include a first component 606, a second component 608, and a third component 610. Additionally, the computer 600 may be associated with a process 614 and data 616.

The first component 606 is configured to prevent a split brain scenario (SBS) in a pair of high availability servers. The first component 606 prevents a SBS by maintaining single writer access to a resource by controlling the resource according to a timer bounded arbitration protocol. The timer bounded arbitration protocol may control self-termination of a writer process. The second component 608 prevents unnecessary hardware resets by negotiating between the high availability servers. For example, if a system slowdown occurs the second component 608 may negotiate for an additional period of time in which to control the resource according to the timer bounded ARB protocol.

The third component 610 is configured to force a hardware reset of an apparatus on which the writer process is running.

Generally describing an example configuration of the computer 600, the processor 602 may be a variety of various processors including dual microprocessor and other multi-processor architectures. A memory 604 may include volatile memory (e.g., RAM (random access memory)) and/or non-volatile memory (e.g., ROM (read only memory)). The memory 604 can store a process 614 and/or a data 616, for example. The process 614 may be a SBS prevention process and the data 616 may be co-ordination and control data.

The bus 612 may be a single internal bus interconnect architecture and/or other bus or mesh architectures. While a single bus is illustrated, it is to be appreciated that the computer 600 may communicate with various devices, logics, and peripherals using other busses (e.g., PCIE (peripheral component interconnect express), 1394, USB (universal serial bus), Ethernet). The bus 612 can be types including, for example, a memory bus, a memory controller, a peripheral bus, an external bus, a crossbar switch, and/or a local bus.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer readable medium storing computer executable instructions that when executed by a computer control the computer to perform a method, the method comprising:
   monitoring control of an arbitration (ARB) block by an active file system manager (FSM) where control of the ARB block is based, at least in part, on a timer bounded ARB protocol, where the timer bounded ARB protocol includes re-branding the ARB block within 0.5 seconds;
   requesting permission from a standby file system portmapper (FSMPM) to restart a dead-man timer for the active FSM, where the dead-man timer is set to 0.5 seconds;
   selectively restarting the dead-man timer based, at least in part, on the permission from the standby FSMPM; and
   selectively forcing a hardware reset of an apparatus running the active FSM upon expiration of the dead-man timer.

2. The computer-readable medium of claim 1, the method comprising:
   measuring a response time between an active FSMPM for the active FSM requesting permission from the standby FSMPM and the active FSMPM for the active FSM receiving the permission from the standby FSMPM; and
   selectively restarting the dead-man timer upon determining that the response time is within a predetermined limit.

3. The computer readable medium of claim 1, where monitoring control of the ARB block is based, at least in part, on a heartbeat signal provided by the active FSMPM for the active FSM and where the timer bounded ARB protocol defines an amount of elapsed time between heartbeats.

4. The computer readable medium of claim 1, the method comprising:
   selectively activating a standby FSM associated with the standby FSMPM as a replacement of the active FSM.

5. The computer readable medium of claim 4, where selectively activating the standby FSM as the replacement FSM comprises:

sending an activation command to the standby FSM;

controlling the standby FSM to monitor the ARB block for a safety period of time; and controlling the standby FSM to write the ARB block after determining that the active FSM has not written the ARB during the safety period of time starting the standby dead-man timer after writing the ARB block.

6. An apparatus, comprising:

a processor;

a memory;

a set of logics; and an interface to connect the processor, the memory, and the set of logics, the set of logics comprising:

a negotiation logic configured to control an active FSMPM process running on the apparatus to selectively request permission from a standby FSM available on a standby apparatus to restart an active dead-man timer on an active metadata controller (MDC) upon determining that a standby FSMPM for the standby FSM is not activating the standby FSM, where the dead-man timer is set to less than five seconds;

a metadata controller reset logic configured to selectively terminate the active MDC; and an ARB logic configured to maintain single writer access to file system metadata using an ARB block, and configured to control the active FSM and the standby FSM to synchronize control of the ARB block by using the ARB block.

7. The apparatus of claim 6, the negotiation logic being configured to measure a response time between selectively requesting permission from the standby MDC and receiving permission from the standby MDC and to restart the dead-man timer on the active MDC if the response time is within a predetermined limit.

8. The apparatus of claim 6, the active MDC comprising:

the active file system portmapper (FSMPM); and the active file system manager (FSM) connected to the active FSMPM by a socket;

where the active FSMPM is configured to selectively force an election of the standby FSM to replace the active FSM upon the metadata controller reset logic determining that the active FSM has terminated; and where the active FSM is configured to maintain ownership of the ARE block by periodically writing the ARB block according to the timer bounded ARB protocol and to reset the dead-man timer upon successfully writing the ARB block.

9. The apparatus of claim 6, the standby MDC comprising:

the standby FSMPM;

the standby FSM connected to the standby FSMPM by a socket; and a standby dead-man timer;

where the standby FSM is configured to acquire ownership of the ARB block upon activation of the standby FSM, to maintain ownership of the ARB block by periodically writing the ARB block according to the timer bounded ARB protocol, and to reset the standby dead-man timer upon successfully writing the ARB block.

10. The apparatus of claim 6, the ARB logic being configured to communicate with a data store, where the data store stores the ARB block, at least a portion of a file system associated with the file system metadata, and the file system metadata.

11. The apparatus of claim 6, where the active MDC and the standby MDC reside on separate pieces of computer hardware, and where the active MDC and the standby MDC communicate over a computer network.

12. The apparatus of claim 10, where the apparatus, the data store, and a client computer are connected by a computer network, and where the client computer is configured to write the portion of the file system data as controlled by the active MDC.

13. The apparatus of claim 9, the timer bounded ARB protocol comprising:

controlling the active FSM to write the ARB block once per a FSM write period to indicate continued ownership of the ARB block and, upon successfully writing the ARB block, to restart the active dead-man timer;

controlling the standby FSMPM to selectively activate the standby FSM upon determining that the standby FSM has been selected to take control of the ARB block; and upon being activated by the standby FSMPM, the standby FSM selectively taking control of the ARB block by writing the ARB block after a delay time period.

14. The apparatus of claim 6, where the metadata controller reset logic is configured to control a kernel thread to reset the active MDC.

15. The apparatus of claim 8, where there is a one to one relationship between the ARB block and the active FSM, and where there is a one to one relationship between the active FSM and a file system associated with the file system metadata.

16. The apparatus of claim 6, where the metadata controller reset logic is configured to terminate the active FSM before the standby FSM finishes taking control of the ARB block.

17. A computer, comprising:

a first component configured to prevent a split brain scenario in a pair of high availability servers by maintaining single writer access to a resource by controlling the resource according to a timer bounded arbitration protocol that controls self-termination of a writer process, where the timer bounded arbitration protocol includes re-branding an arbitration block within 0.5 seconds;

a second component configured to prevent unnecessary hardware resets by negotiating between the pair of high availability servers by providing restarts of the timer under safety conditions that include a delay of at least two seconds; and a third component configured to force a hardware reset of an apparatus on which the writer process is running and to control a second writer process on a second computer to take control of the resource upon determining that the first writer process has terminated.

* * * * *